(12) United States Patent
Hammerand et al.

(10) Patent No.: US 7,921,720 B2
(45) Date of Patent: *Apr. 12, 2011

(54) DIAL-TYPE FLOW-RESTRICTION GAUGES

(75) Inventors: H. Dianne Hammerand, Vinton, IA (US); Charles H. Berry, III, Cedar Falls, IA (US)

(73) Assignee: Engineered Products Company, Waterloo, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/425,761

(22) Filed: Apr. 17, 2009

(65) Prior Publication Data

US 2009/0199645 A1 Aug. 13, 2009

Related U.S. Application Data

(63) Continuation of application No. 11/764,747, filed on Jun. 18, 2007, now Pat. No. 7,562,579.

(60) Provisional application No. 60/814,233, filed on Jun. 16, 2006.

(51) Int. Cl.
*G01L 7/00* (2006.01)

(52) U.S. Cl. .......................................... 73/700

(58) Field of Classification Search .................. None
See application file for complete search history.

(56) References Cited

U.S. PATENT DOCUMENTS

| | | | |
|---|---|---|---|
| 3,011,470 A | 12/1961 | Stoermer | |
| 3,027,865 A | 4/1962 | Kautz et al. | |
| 3,066,527 A | 12/1962 | Stein | |
| 3,119,367 A | 1/1964 | Barnes, Jr. et al. | |
| 3,312,187 A | 4/1967 | McKinlay | |
| 3,381,651 A | 5/1968 | McKinlay | |
| 3,388,682 A | 6/1968 | Whiting | |
| 3,487,929 A | 1/1970 | Sample et al. | |
| 3,639,998 A | 2/1972 | Mason | |
| 3,686,835 A | 8/1972 | Strange et al. | |
| 3,690,318 A | 9/1972 | Gorsuch | |
| 3,916,817 A | 11/1975 | Kemp | |
| 4,033,733 A | 7/1977 | Nelson | |

(Continued)

FOREIGN PATENT DOCUMENTS

DE 2616315 10/1977

(Continued)

OTHER PUBLICATIONS

"U.S. Appl. No. 11/040,913, Non Final Office Action mailed Sep. 26, 2007", 10 pgs.

(Continued)

*Primary Examiner* — Andre J Allen
(74) *Attorney, Agent, or Firm* — Schwegman, Lundberg & Woessner, P.A.

(57) ABSTRACT

Dial-type flow-restriction gauges are used for indicating flow-restriction conditions of fluid filters, such as automobile air and fuel filters. Prior versions of these type filters have been more complicated and costly to manufacture than desirable. Accordingly, the present inventors have devised, among other things, an exemplary dial-type flow-restriction gauge that is inexpensive to manufacture and performs reliability and consistently over a wide temperature range. One exemplary gauge includes an external dial that rotates relative a restriction scale in response to a differential pressure. Placement of the dial on the exterior of the gauge eliminates the need to use clear material and allows embedding of the restriction scale into an exterior surface of the gauge.

15 Claims, 5 Drawing Sheets

U.S. PATENT DOCUMENTS

| | | | |
|---|---|---|---|
| 4,162,660 | A | 7/1979 | Albertson et al. |
| 4,369,728 | A | 1/1983 | Nelson |
| 4,445,456 | A | 5/1984 | Nelson |
| 4,620,500 | A | 11/1986 | Condon |
| 4,688,511 | A | 8/1987 | Gerlach et al. |
| 4,726,823 | A | 2/1988 | Brice |
| 5,325,707 | A | 7/1994 | Slater |
| 5,616,157 | A | 4/1997 | Mead et al. |
| 5,753,821 | A | 5/1998 | Chou |
| 5,845,597 | A | 12/1998 | Karpal |
| 5,850,183 | A | 12/1998 | Berry, III |
| 6,161,417 | A | 12/2000 | Nepsund |
| 6,327,902 | B1 | 12/2001 | Berry, III et al. |
| 6,604,486 | B1 | 8/2003 | Krisko et al. |
| 7,137,303 | B2 | 11/2006 | Janik et al. |
| 7,562,579 | B2 | 7/2009 | Hammerand et al. |
| 2006/0042392 | A1 | 3/2006 | Janik et al. |
| 2006/0163127 | A1 | 7/2006 | Berry et al. |
| 2008/0072687 | A1 | 3/2008 | Hammerand et al. |
| 2009/0071392 | A1 | 3/2009 | Berry, III et al. |

FOREIGN PATENT DOCUMENTS

| | | |
|---|---|---|
| DE | 3428307 | 2/1986 |
| DE | 10315052 | 12/2003 |
| EP | 0229893 A2 | 7/1987 |
| FR | 2259637 | 8/1975 |
| GB | 0929085 | 6/1963 |
| WO | WO-2006/079067 A1 | 7/2006 |
| WO | WO-2006/081564 A1 | 8/2006 |
| WO | WO-2007/149445 A1 | 12/2007 |

OTHER PUBLICATIONS

"U.S. Appl. No. 11/040,913, Notice of Allowance mailed Nov. 14, 2008", 13 pgs.

"U.S. Appl. No. 11/040,913, Response filed Mar. 26, 2008 to Non-final Office Action mailed Sep. 26, 2007", 11 pgs.

"U.S. Appl. No. 11/764,747, 312 Amendment filed Mar. 5, 2009", 8 pgs.

"U.S. Appl. No. 11/764,747, Non-Final Office Action mailed May 5, 2008", 8 pgs.

"U.S. Appl. No. 11/764,747, Notice of Allowance mailed Dec. 5, 2008", 8 pgs.

"U.S. Appl. No. 11/764,747, PTO Response mailed Jun. 11, 2009 to 312 Amendment filed Mar. 5, 2009", 2 pgs.

"U.S. Appl. No. 11/764,747, Response filed Nov. 5, 2008 to Non Final Office Action mailed May 5, 2008", 10 pgs.

"International Application Serial No. PCT/US2006/002440, International Preliminary Examination Report mailed May 2, 2008", P326, 6.

"International Search Report for corresponding PCT Application No. PCT/US2006/002440", (Jun. 2, 2006), 3 pgs.

"Written Opinion of the International Searching Authority for PCT Application No. PCT/US2006/002440", (Jun. 2, 2006), 4 pgs.

"European Application No. 07796265.2, Office Action Mailed Mar. 31, 2009", 2 pgs.

"U.S. Appl. No. 12/324,365 Non-Final Office Action mailed Sep. 17, 2010", 13 pgs.

"U.S. Appl. No. 12/324,365, Restriction Requirement mailed May 20, 2010", 5 pgs.

"European Application Serial No. 06719340.9, Office Action mailed Feb. 3, 2010", 2 pgs.

"European Application Serial No. 07796265.2, Communication mailed Mar. 22, 2010", 4 pgs.

"European Application Serial No. 07796265.2, Office Action Response Filed Jul. 23, 2010", 8 pgs.

"European Application Serial No. 07796265.2, Response filed Oct. 7, 2009 to Communication dated Mar. 31, 2009", 8 pgs.

"European Application Serial No. 07796265.2, Response filed Oct. 7, 2009 to Communication mailed Mar. 31, 2009", 8 pgs.

"International Application Serial No. PCT/US2007/014294, International Searxh Report mailed Nov. 12, 2007", 4 pgs.

"International Application Serial No. PCT/US2007/014294, Written Opinion mailed Nov. 12, 2007", 6 pgs.

FIG. 2H

DIAL-TYPE FLOW-RESTRICTION GAUGES

RELATED APPLICATION

This application is a continuation of U.S. patent application Ser. No. 11/764,747, filed on Jun. 18, 2007, now U.S. Pat. No. 7,562,579 which claims the benefit under 35 U.S.C. 119(e) of U.S. Provisional Patent Application 60/814,233 which was filed on Jun. 16, 2006, which applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2006 Engineered Products Company, Inc.

TECHNICAL FIELD

Various embodiments of the present invention concern devices for monitoring fluid-filter performance, particularly gauges that provide a dial to visually indicate restricted fluid flow through such filters. Some embodiments of the invention may also be used in other applications.

BACKGROUND

Many modern systems include air or liquid filters to ensure proper or reliable performance. For example, automobiles include air and fuel filters to remove dirt and other particulates from the air and fuel that are mixed and then ignited within their internal combustion engines. As a consequence of their proper operation, these filters collect particulates over time and increasingly restrict the flow of air or fuel into engines. Eventually, the filters become more restrictive than desirable to promote fuel efficiency or other performance criteria and require replacement.

To facilitate timely filter replacement, automobiles and other systems sometimes include filter-monitoring devices, which monitor pressure or vacuum levels that result from fluid flow through associated filters. These devices are calibrated to detect when particular pressure or vacuum conditions occur and to respond to such occurrences in particular ways. For example, some devices, referred to herein as dial-type flow restriction gauges (or indicators) provide a dial that rotates relative to a fixed scale in response to differential pressure, thereby providing a visible measurement of flow restriction through a filter.

The present inventors have recognized that commercially available dial-type flow-restriction gauges are not only more costly to make than desirable, but also prone to reliability and performance issues. For example, one known gauge provides a dial within a two-piece housing having a clear plastic upper portion and an opaque plastic lower portion. The clear plastic portion provides a view of the internal dial relative to a restriction scale printed on the exterior of the clear plastic. However, suitable clear plastic is not only more expensive (two-to-three times more), but more vulnerable to degrading reactions with fuel, oil, and other chemicals common to automobile engine environments than the opaque portion. This known indicator also uses a relatively expensive spiral spring to bias rotation of the dial and a separate O-ring to seal the housing.

Accordingly, the present inventors have recognized a need to improve conventional dial-type flow-restriction gauges.

SUMMARY

To address this and/or other needs, the present inventors devised, among other things, various embodiments of dial-type flow-restriction gauge, related components, subassemblies, methods, and systems. One exemplary flow-restriction gauge includes a two-piece housing, a flexible diaphragm, a dial indicator, and a restriction scale. The flexible diaphragm, which resides within the two-piece housing, flexes in response to differential pressures on its opposing sides. The flexing rotates the dial indicator, which is positioned on the exterior surface of the housing, relative to the flow-restriction scale on the exterior surface. Position of the dial indicator visually correlates to a corresponding flow restriction in an associated filter. Notably, placement of the dial indicator (or pointer) on the exterior surface eliminates the need to form a clear housing, and thus not only reduces the manufacturing cost of the gauge, but also improves its tolerance of engine fuel, oils, and other environmental fluids.

DETAILED DESCRIPTION OF EXEMPLARY EMBODIMENT(S)

This description, which incorporates the above-identified figures and appended claims, describes one or more specific inventive embodiments. These embodiments, offered not to limit but only to exemplify and teach one or more inventions, are shown and described in sufficient detail to enable those skilled in the art to implement or practice the invention(s). The description may use terms, such as upper or lower in reference to specific features of various as embodiments;

however, unless included in the claims, such terms are merely to aid correlating the drawings with the written description. Moreover, where appropriate to avoid obscuring the invention(s), the description may omit certain information known to those of skill in the art.

Figure 1A:
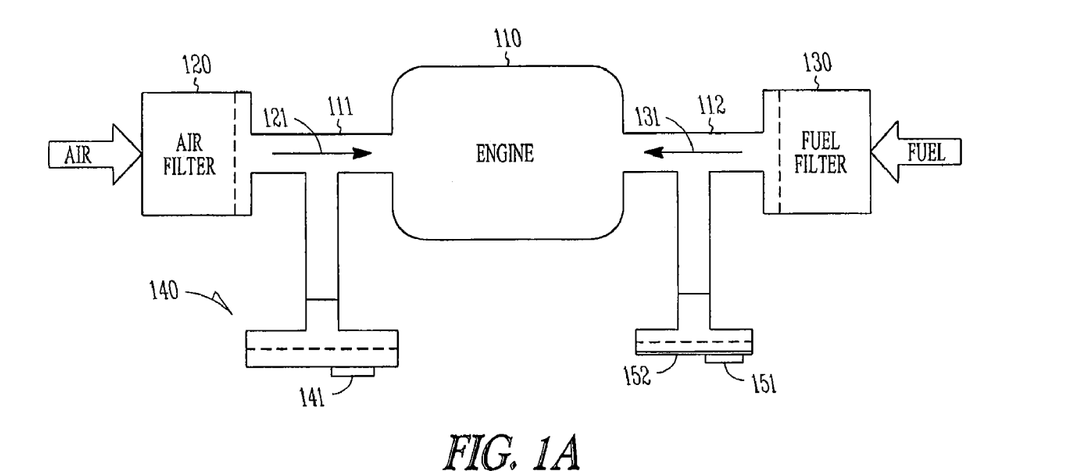
FIG. 1A is a block diagram of an exemplary engine system 100 which corresponds to one or more embodiments of the invention.

FIG. 1A shows a block diagram of an exemplary engine system 100 which incorporates teachings of the present invention. System 100 includes an engine 110, a fuel filter 120, an air filter 130, and flow-restriction gauges (or indicators) 140 and 150.

Engine 110 includes an air inlet 111 and a fuel inlet 112 for respectively channeling air and fuel into engine 110 for combustion according to known principles. In the exemplary embodiment, engine 110 takes the form of an internal combustion engine; however, in some embodiments, engine 110 takes other forms.

Air filter 120 provides a filtered air flow 121 through air inlet 111 to engine 110. In the exemplary embodiment, air filter 120 takes any convenient or desirable form.

Fuel filter 130, which is in fluid communication with fuel inlet 112, provides a filtered air flow 131 through inlet 112 to engine 110. In the exemplary embodiment, fuel filter 130 takes any convenient or desirable form.

Flow restriction gauge 140, which is sized to measure flow-restriction based on a difference between vacuum pressure created by air flow 121 and atmospheric pressure, includes an exterior dial 141 for indicating a flow-restriction level. Similarly, gauge 150 is sized to measure flow-restriction based on a difference between vacuum pressure created by fuel flow 131 and atmospheric pressure, and includes external dial 151 and scale label 152.

Figure 1B:
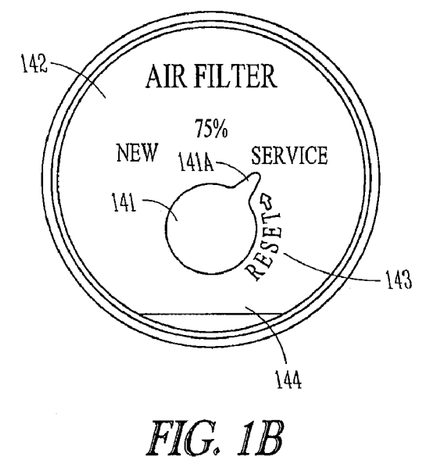
FIG. 1B is a top view of an exemplary dial-type flow-restriction gauge shown in FIG. 1A.

FIG. 1B, a top view of gauge 140, shows that in the exemplary embodiment, dial 141 includes a dial pointer 141A and that gauge 140 further includes scale markings 142, reset markings 143, and label key 144, all of which may be embossed, molded, or engraved into a top surface of gauge 140. Scale markings 142 denote three fluid-restriction levels: New, which corresponds to any restriction less than 75% of maximum allowable restriction (determined for engine 110); 75% of maximum allowable restriction; and Service, which indicates that the air filter should be replaced because it is restricting air flow at or beyond the maximum desirable restriction level. (Other embodiments may provide greater or lesser numbers of restriction levels and fluid-restriction thresholds other than 75%.) Indeed, some embodiments may even provide a continuous read out of flow restriction over all or a portion of the read out range. (The continuous readout can be achieved by using a rough surface on a ramped cam in combination with a sharp axial projection. For example, one embodiment may provide continuous readout between the 75% and Service levels.)

Reset marking 143 indicates that gauge 140 can be manually reset by rotating dial 141 counterclockwise from the Service level back to the New level. And, label key 144 facilitates manual or automated alignment and attachment of an adhesive scale label, such as label 152 in FIG. 1C.

Figure 1C:
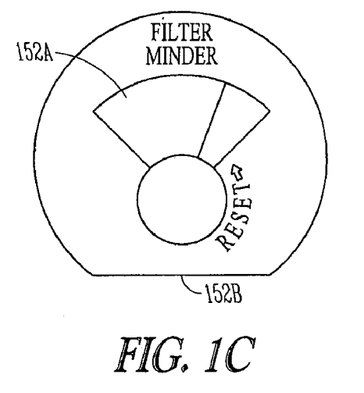
FIG. 1C is a top view of an exemplary adhesive label shown in FIG. 1A.

Label 152, which takes a generally circular shape, includes color scale region 152A and label mount key 152B. In the exemplary embodiment, color scale 152A includes a green sector which corresponds to flow-restriction levels that are less than a maximum allowable flow restriction and a red sector which corresponds to flow-restriction levels greater than the maximum allowable flow restriction. Some embodiments may include an intermediate yellow sector; moreover, some embodiments also include glow-in-the-dark graphics based on phosphorescence or chemiluminescence materials, such as zinc sulfide or strontium aluminate without a radioactive element, such as radium.

Figure 2A:
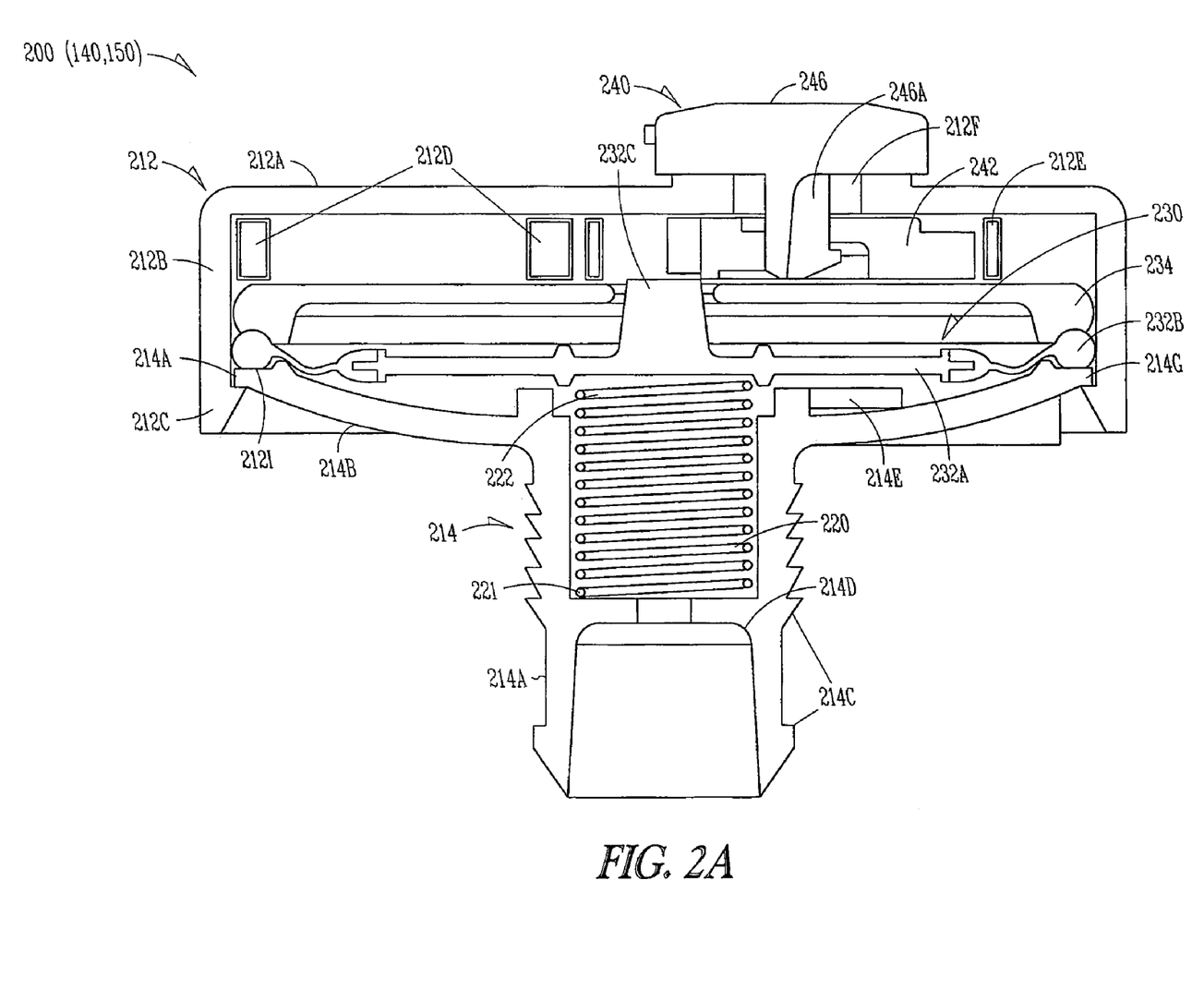
FIG. 2A is a cross-sectional view of an exemplary dial-type flow-restriction gauge 200, which corresponds to one or more embodiments of the invention.
Figure 2B:
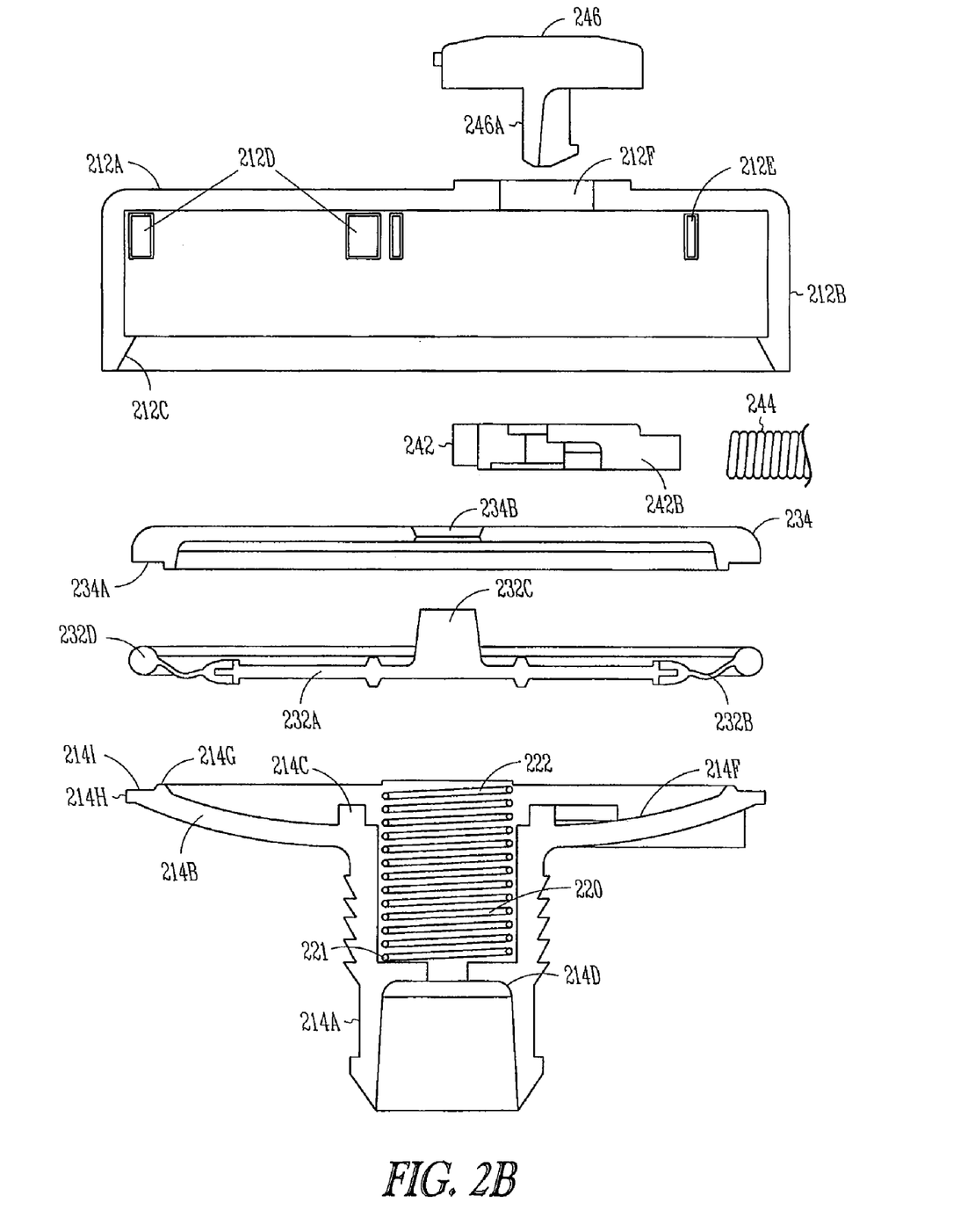
FIG. 2B is an exploded central cross-sectional view of gauge 200 in FIG. 2A.

FIGS. 2A and 2B respectively show a central cross-sectional view and an exploded central cross-sectional view of an exemplary flow-restriction gauge 200, which may be substituted for gauges 140 and 150 in FIG. 1. Gauge 200 includes a housing assembly 210, a diaphragm assembly 220, and a calibration spring 230, and a dial assembly 240.

Housing assembly 210, which includes an upper cap portion 212 and a lower housing or inlet portion 214. In the exemplary embodiment, all components of the housing assembly are molded from an opaque material, such as nylon.

In particular, upper cap portion 212, which in the exemplary embodiment has a generally right cylindrical cup- or pan-like structure, includes a top portion 212A, a sidewall 212B, annular locking ledge 212C, spacer studs 212D, dial opening 212E, and cam pocket wall 212F.

Top portion 212A, which includes scale markings or labels as shown in FIG. 1B, is integrally molded with sidewall 212B. Sidewall 212B, which circumscribes the perimeter of top portion 212A, extends downward vertically and terminates into annular locking ledge 212C. Extending vertically downward from the underside of top portion 212B are six spacer studs 212D distributed circumferentially around the interior joint between top portion 212A and sidewall 212B.

Figure 2C:
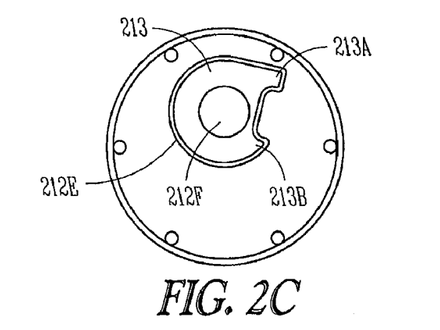
FIG. 2C is a bottom view of upper cap portion of gauge 200, which corresponds to one or more embodiments of the invention.

Cam pocket wall 212E also extends downwardly from the underside of top portion 212A, defining peripheral shape and depth of a cam pocket (or recess) 213, shown best in FIG. 2C. The height of the cam pocket wall 212E and the heights of spacer studs 212D, measured from the underside of top portion 212A are substantially equal in the exemplary embodiment. Cam pocket 213 surrounds dial opening 212E in top portion 212A of housing assembly 210.

Lower housing portion 214, which in the exemplary embodiment is integrally molded from a durable nylon, includes a lower inlet portion 214A and an upper annular flange portion 214B.

Lower inlet portion 214A includes exterior engagement features 214C, such as threads, ribs, or flanges, to facilitate fluid-tight coupling to an air or fuel inlet, such as inlet 111 or 112 in FIG. 1A. Inlet portion 214A also includes an annular interior shelf 214D, and an upper circular rim or ribs 214E.

Upper annular flange portion 214B extends outward circumferentially from an upper portion of inlet portion 214A defining a shallow bowl region 214F. An annular ledge 214G is spaced radially inward from an outer rim portion 214H of flange portion 214B, thereby defining an annular seat 214I. The outer rim portion engages in a snap fit with annular locking ledge 212C of the upper cap portion of the housing assembly.

In addition to housing assembly 210, gauge 200 includes calibration spring 220, diaphragm 230, and dial assembly 240.

Calibration spring 220 has a lower portion 221 and an upper portion 222. Lower portion 221 rests on annular interior shelf 214D and the upper portion 222 extend upward into shallow bowl region 214F of flange portion 214B to contact diaphragm 230.

Figure 2D:
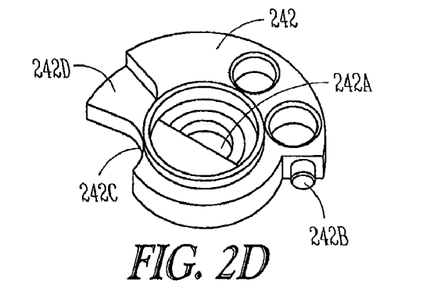
FIG. 2D is a perspective view of a cam (or escapement) portion of gauge 200, which corresponds to one or more embodiments of the invention.
Figure 2E:
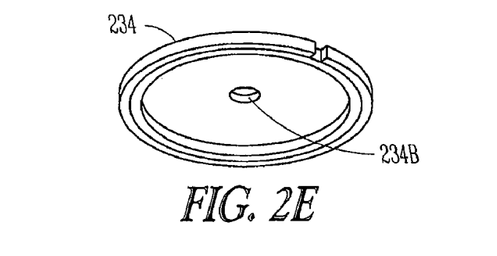
FIG. 2E is a perspective view of a circular plate portion of gauge 200, which corresponds to one or more embodiments of the invention.
Figure 2F:
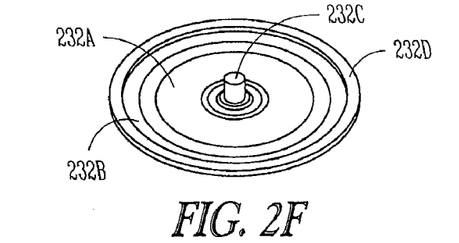
FIG. 2F is a perspective view of a diaphragm portion of gauge 200, which corresponds to one or more embodiments of the invention.
Figure 2G:
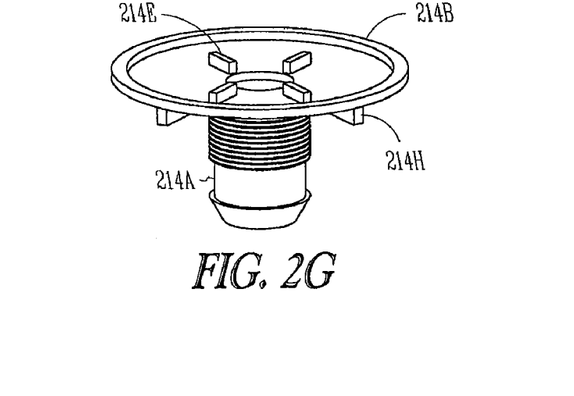
FIG. 2G is perspective view of an inlet housing portion of gauge 200, which corresponds to one or more embodiments of the invention.
Figure 2H:
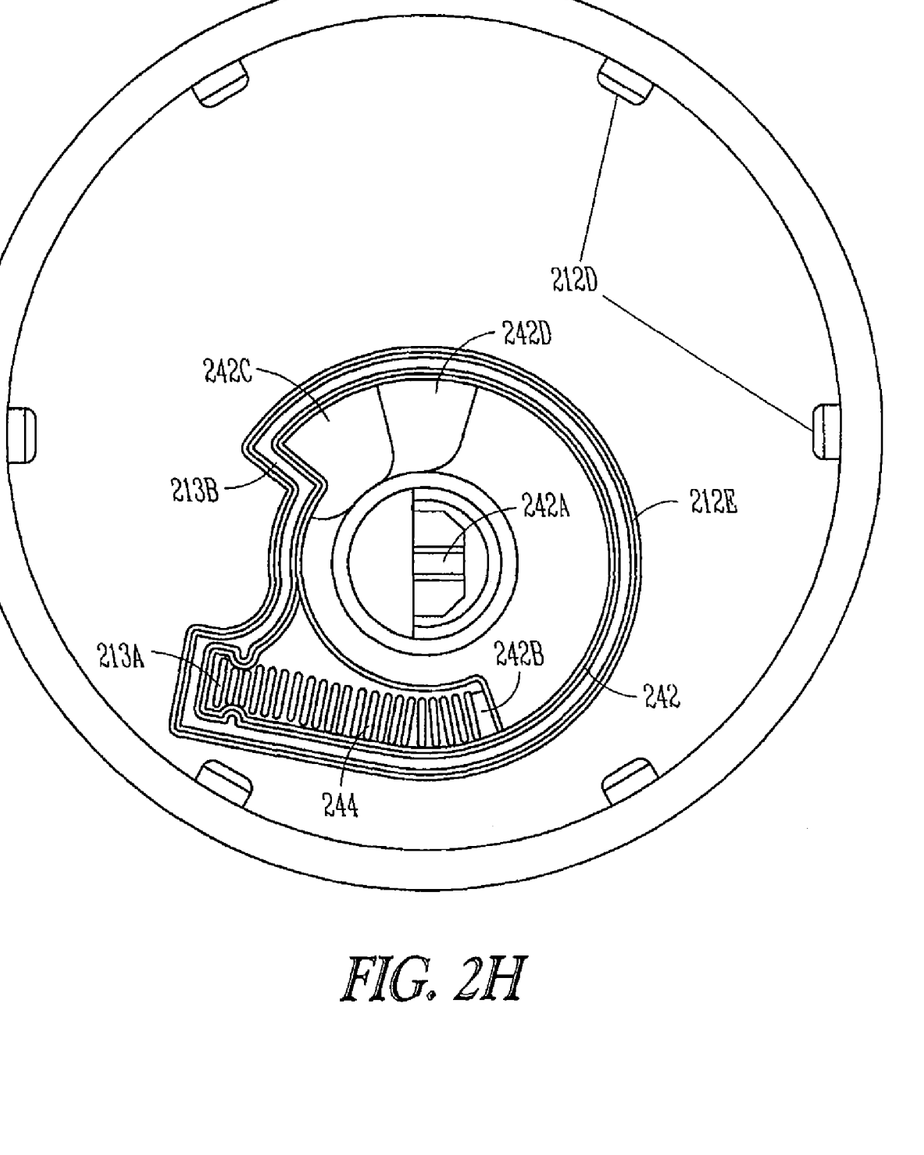
FIG. 2H is a bottom view of the upper cap and dial assembly portions of the gauge 200, which corresponds to one or more embodiments of the invention.

Diaphragm 230, also shown in the top perspective view of FIG. 2F, includes a rigid central disk portion 232 and a flexible outer annular portion 234. Central disk portion 232, which may be injection molded from a suitable plastic, includes a tapered axial projection 232C. Flexible outer annular portion 232B, which is formed of silicon or other suitably resilient and substantially fluid impervious material and over-molded onto central disk portion 232A, includes an outer annular bead 232D. (At least one advantage of the over-mold configuration is that it reduces the mass of the diaphragm, which in combination with the spring constant of the calibration spring dramatically improves the ability of the gauge to avoid vibration- or shock-induced false triggering. However, in some embodiments, diaphragm 230 is made of a single material.)

Annular bead 232D is sandwiched between lower inlet portion 214 of the housing assembly, specifically annular seat 214I, and a lower rim 241A of circular plate 241 of dial assembly 240. In this arrangement, the diaphragm defines and provides a generally fluid tight seal between a lower chamber 233 that is in fluid communication with inlet 111 or 112 (in FIG. 1), and an upper chamber 235 that is fluid communication with the atmosphere via dial opening 212E. ('Generally fluid-tight,' as used herein, refers to a seal that has a leakage rate low enough to not interfere with the operation of the diaphragm and the flow-restriction gauge.)

In addition to circular plate 241, dial assembly 240 further includes a cam portion 242, a helical spring 244, and a dial 246.

Circular plate 241, which is shown in perspective in FIG. 2E, includes annular rim 241A and a central opening 241B. Annular rim 241A assists in sealing lower chamber 235 by engaging the outer annular bead of diaphragm under force transferred through spacing studs 212D of upper housing cap 212. Central opening 241B allows tapered axial projection 232C (of diaphragm 230) to extend through an engage or disengage from cam portion 242.

Cam portion 242, which is shown most completely in the perspective view of FIG. 2D, includes a dial-mount opening 242A, a spring mounting post 242B, a notch 242C, and a step 242D. Dial-mount opening 242A engages in a snap fit with two prongs 246A that extend from the underside of dial 246, thereby securing cam portion 242 within cam pocket 213. Spring mounting post 242B fits within one end of helical spring 244 and the other end of the spring fits within spring nook 213A of cam pocket 213. The spring biases rotation of the cam portion toward axial projection 232C of diaphragm 232.

Notch 242C engages with axial projection 232 when dial 246 is turned to a reset position. As diaphragm 230 flexes downward against the calibration spring in response to a vacuum created by a fluid flow exiting a filter, axial projection 232C moves downward in unison. Over time the filter restriction increases the vacuum sufficiently to draw the diaphragm 45 and the projection down past the edge of notch 242C, allowing the cam to rotate under the force of spring 244 (best depicted in FIG. 2F) and engaging step 242D with the projection. Dial 246, which in some embodiments includes a glow-in-the-dark material, rotates in unison with the cam portion, and thus indicates, for example, a flow-restriction of 75%. Further restriction of flow through the filter increases the vacuum and continues to draw the projection downward, eventually disengaging it from step 242D and allowing the cam to rotate to its rest position, with the notch 242C against a stop portion 213B of cam pocket 213.

CONCLUSION

In furtherance of the art, the present inventors have presented, among other things, an exemplary flow-restriction gauge. The exemplary gauge has eight total parts, nine if the optional adhesive scale label is included. The exemplary gauge promises not only to be easily manufactured and assembled with considerable savings over conventional dial-type flow-restriction gauges, but also to provide reliable and consistent operation over a wide temperature range.

What is claimed is:

1. A flow-restriction gauge for use with internal combustion engines, the gauge comprising:
    a housing assembly including an upper cap portion and a lower inlet portion, the upper cap portion having an opening and the lower inlet portion having means for fluidly communicating with a vacuum generated by an internal combustion engine; and
    a dial pointer positioned on an exterior surface of the upper cap portion and operatively coupled to rotate in response to the vacuum.

2. The flow-restriction gauge of claim 1, wherein the upper cap portion and the lower cap portion are opaque and snapped together.

3. The flow-restriction gauge of claim 1, wherein the exterior surface of the upper cap portion includes a flow-restriction scale integrally molded therewith.

4. The flow-restriction gauge of claim 1, further including label having at least one flow-restriction level, the label adhered to the exterior surface of the upper cap portion.

5. The flow-restriction gauge of claim 1, wherein the upper cap portion includes an interior surface opposite the exterior surface, with the interior surface having a pocket region being defined by at least one wall, and surrounding the opening.

6. The flow-restriction gauge of claim 5, further comprising:
    a cam within the pocket region, the cam having at least one step;
    a helical spring having one end mounted to a portion of the cam and another end mounted to a portion of the pocket region.

7. The flow-restriction gauge of claim 6, further comprising:
    a diaphragm within an interior of the housing assembly between the upper cap portion and the lower inlet portion, the diaphragm having a deflectable portion and an axial projection;
    a plate within the interior of the housing assembly between the pocket region of the upper cap portion and the diaphragm and having an opening through which the axial projection engages the cam.

8. The flow-restriction gauge of claim 7:
    wherein the lower inlet portion of the housing assembly includes:
        an inlet defining an axial passage for allowing fluid communication between the diaphragm and a fluid line; of the inlet, the passage having a passage restriction between the diaphragm and fluid line;
        an upper flange portion extending from an upper portion of the inlet and having an outer annular portion in a snap fit with an interior ledge of the upper cap portion, the diaphragm sandwiched between the outer annular portion and the plate;
    wherein the gauge further comprises a helical calibration spring within the passage, the spring having a lower end resting on the passage restriction and an upper end contacting the diaphragm, thereby reducing profile height of the flow-restriction gauge.

9. A flow-restriction gauge for use with internal combustion engines, the gauge comprising:
    a housing assembly including an upper cap portion and a lower inlet portion, the lower inlet portion having means for fluidly communicating with a vacuum generated by an internal combustion engine;
    the upper cap portion having an opening, an exterior surface surrounding the opening, and an interior surface opposite the exterior surface, with the interior surface defining a recess around the opening;

a cam within the recess, the cam having at least one step;

a helical spring having one end mounted to a portion of the cam and another end mounted to a portion of the pocket region; and a dial pointer positioned on the exterior surface of the upper cap portion and coupled to the cam to rotate in response to the vacuum.

10. The flow-restriction gauge of claim 9, wherein the upper cap portion and the lower cap portion are opaque and snapped together.

11. The flow-restriction gauge of claim 9, further including a label having at least one flow-restriction level, the label adhered to the exterior surface of the upper cap portion.

12. The flow-restriction gauge of claim 9, further comprising:

a diaphragm within an interior of the housing assembly between the upper cap portion and the lower inlet portion, the diaphragm having a deflectable portion and an axial projection;

a plate within the interior of the housing assembly between the pocket region of the upper cap portion and the diaphragm and having an opening through which the axial projection engages the cam.

13. The flow-restriction gauge of claim 12:

wherein the lower inlet portion of the housing assembly includes:

an inlet defining an axial passage for allowing fluid communication between the diaphragm and a fluid line; of the inlet, the passage having a passage restriction between the diaphragm and fluid line;

an upper flange portion extending from an upper portion of the inlet and having an outer annular portion in a snap fit with an interior ledge of the upper cap portion, the diaphragm sandwiched between the outer annular portion and the plate;

wherein the gauge further comprises a helical calibration spring within the passage, the spring having a lower end resting on the passage restriction and an upper end contacting the diaphragm.

14. The flow-restriction gauge of claim 13, wherein the dial includes a dial pointer positioned on the exterior surface of the upper cap portion.

15. A flow-restriction gauge for use with internal combustion engines, the gauge comprising:

a housing assembly including an upper cap portion and a lower inlet portion, the upper cap portion having an opening, an exterior surface surrounding the opening, and an interior surface opposite the exterior surface, with the interior surface having means for defining a recess around the opening;

a cam within the pocket region, the cam having at least one step;

a helical spring having one end mounted to a portion of the cam and another end mounted to a portion of the pocket region; and a dial coupled to the cam to rotate in response to a vacuum in fluid communication with the lower inlet portion of the housing assembly.

* * * * *